US009364952B2

(12) United States Patent
Arai

(10) Patent No.: US 9,364,952 B2
(45) Date of Patent: Jun. 14, 2016

(54) FORCE SENSOR PROTECTION MECHANISM, END EFFECTOR, AND ROBOT ARM

(71) Applicant: CANON KABUSHIKI KAISHA, Tokyo (JP)

(72) Inventor: Masayuki Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/505,282

(22) Filed: Oct. 2, 2014

(65) Prior Publication Data

US 2015/0100160 A1    Apr. 9, 2015

(30) Foreign Application Priority Data

Oct. 4, 2013    (JP) ................................. 2013-209069

(51) Int. Cl.
*G05B 15/00* (2006.01)
*B25J 9/16* (2006.01)
*G01L 5/22* (2006.01)
*G01L 5/00* (2006.01)

(52) U.S. Cl.
CPC .............. *B25J 9/1633* (2013.01); *B25J 9/1612* (2013.01); *G01L 5/0071* (2013.01); *G01L 5/226* (2013.01); *G05B 2219/39496* (2013.01); *G05B 2219/39528* (2013.01)

(58) Field of Classification Search
CPC ..... B25J 9/1633; B25J 9/1612; B01L 5/0071; G01L 5/226; G05B 2219/39496
See application file for complete search history.

(56) References Cited

U.S. PATENT DOCUMENTS

| 5,967,580 A * | 10/1999 | Rosheim ................ B25J 3/04 294/106 |
| 6,868,746 B1 * | 3/2005 | Peshkin .................. G01L 1/14 73/862.53 |
| 2004/0045372 A1 * | 3/2004 | Liu ........................ G01L 5/161 73/862.041 |
| 2004/0217671 A1 * | 11/2004 | Rosenthal ............ A61M 5/142 310/328 |
| 2004/0261544 A1 * | 12/2004 | Peshkin .................. G01L 1/14 73/862.53 |
| 2005/0088131 A1 * | 4/2005 | Furuta ................... B25J 13/085 318/568.12 |
| 2009/0038413 A1 * | 2/2009 | Seibold .................. G01L 5/166 73/862.043 |

FOREIGN PATENT DOCUMENTS

JP    2004-174696 A    6/2004

* cited by examiner

*Primary Examiner* — Ian Jen
(74) *Attorney, Agent, or Firm* — Canon USA Inc. IP Division

(57) ABSTRACT

An end effector base and a finger unit are formed as separate members, and are disposed with a space therebetween. A force sensor is fixed to a finger base of the finger unit, and is disposed with a space between it and the end effector base. Three supporting members are supported by the end effector base, and are configured to be able to be moved by the driving of a driving unit to a position where they support the force sensor and a position where they are separated from the force sensor and support the finger unit.

7 Claims, 6 Drawing Sheets

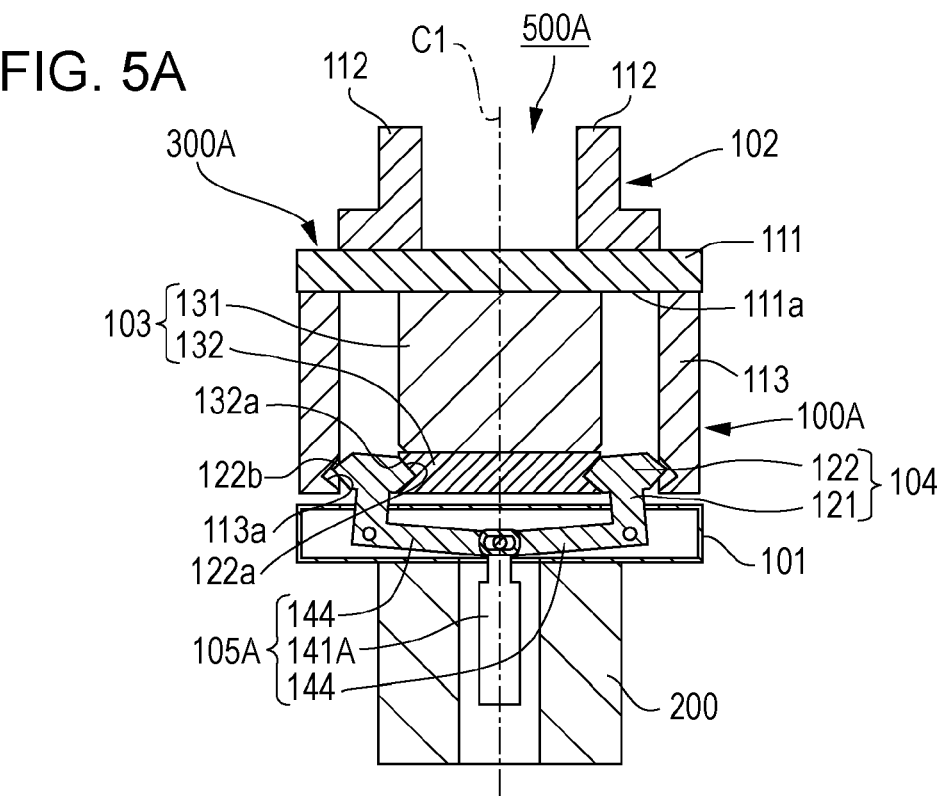
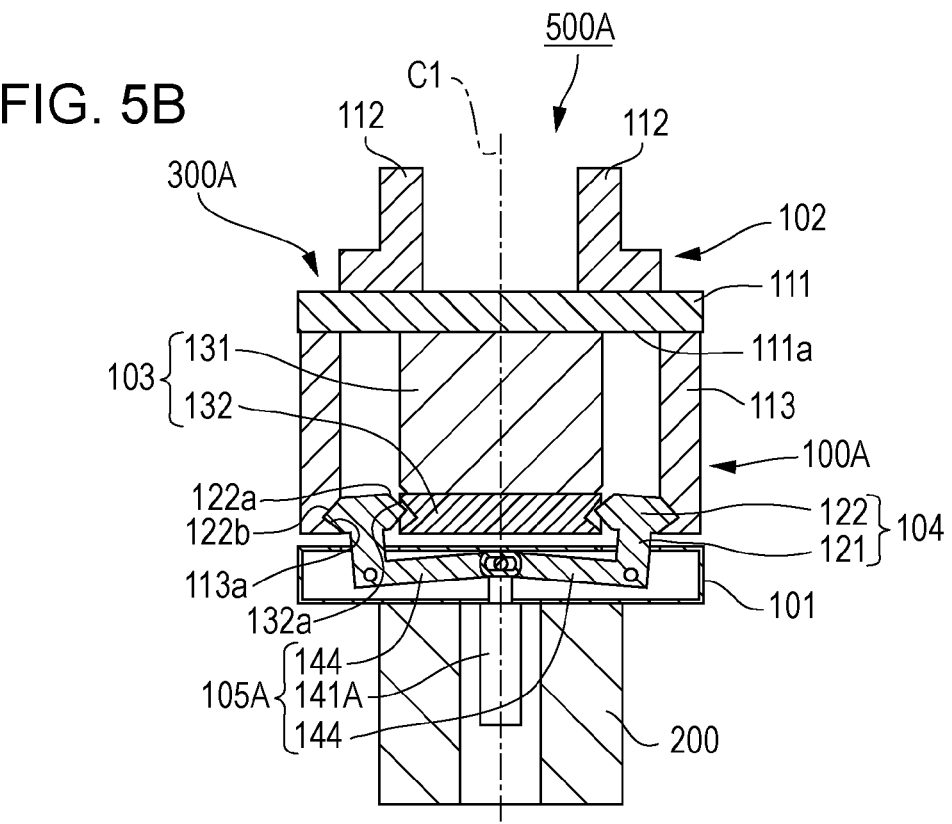

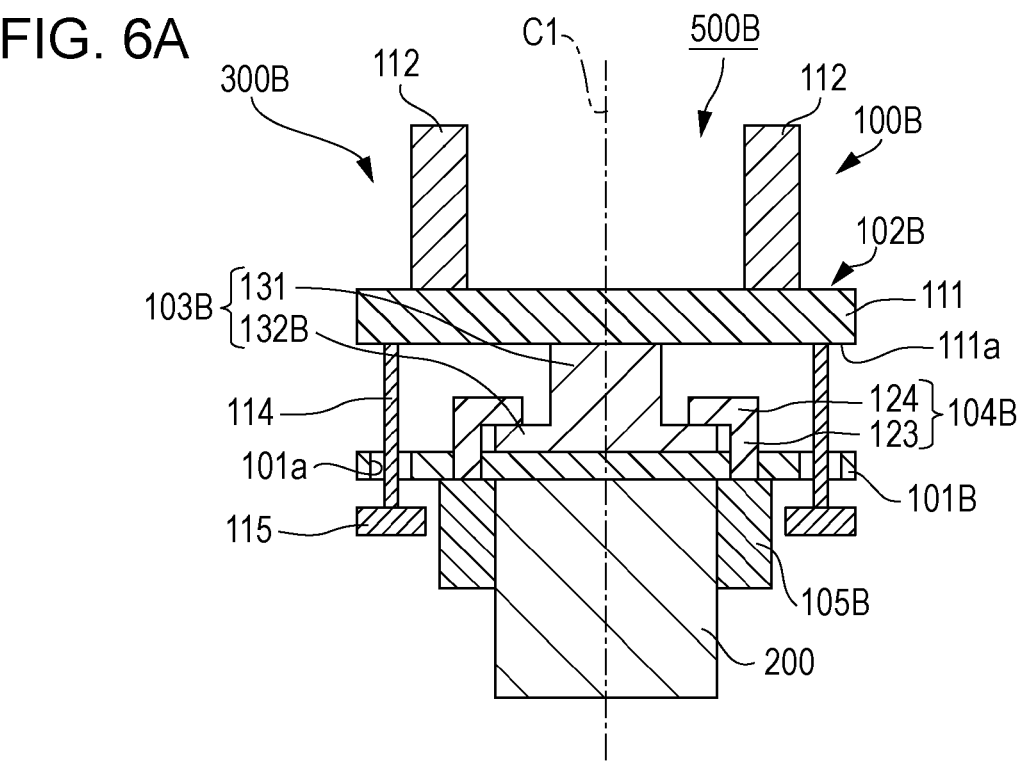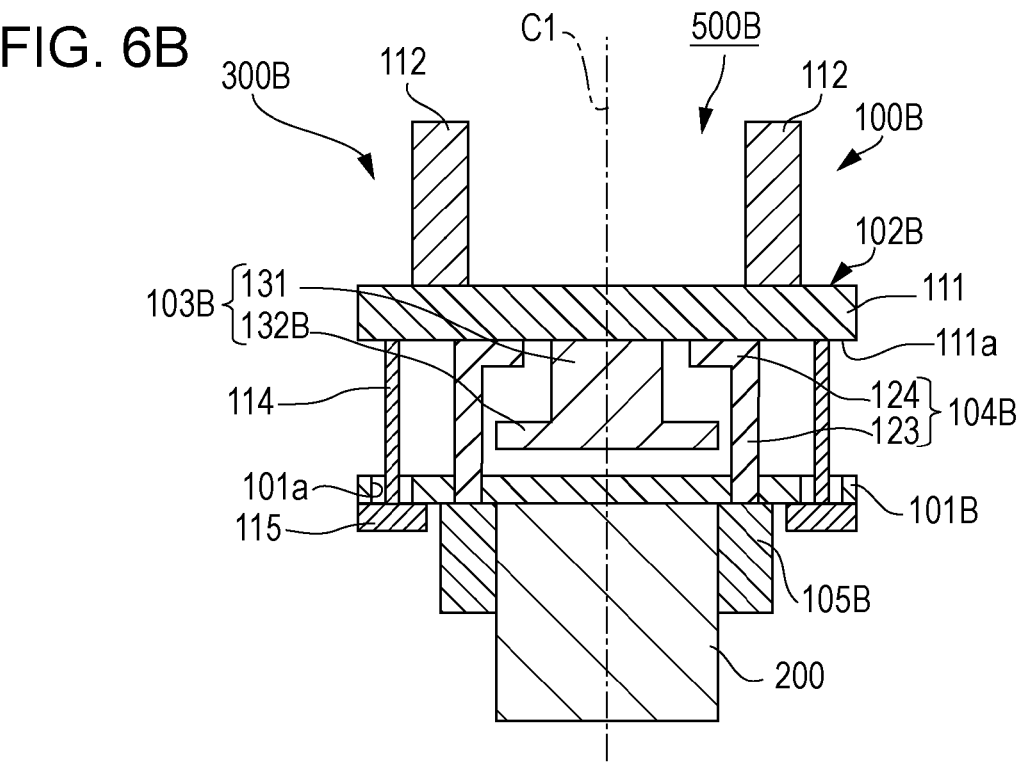

FORCE SENSOR PROTECTION MECHANISM, END EFFECTOR, AND ROBOT ARM

BACKGROUND OF THE INVENTION

1. Field of the Invention

The present invention relates to a force sensor protection mechanism that protects a force sensor against an overload, an end effector having a force sensor protection mechanism, and a robot arm having a force sensor protection mechanism.

2. Description of the Related Art

In industrial robot apparatuses or the like, sometimes, a force sensor is installed between a robot arm and an end effector, force given to a work object by the end effector is detected, and work is performed while adjusting this force. In general, many force sensors calculate force acting on the force sensors on the basis of the change in physical quantity such as the stain of a member. In order to obtain high sensitivity to a weak force or a minute change, the sensitive member of a force sensor is reduced in rigidity, is made easily deformable, and is made frail so that the quantity of strain (the change in physical quantity) of the member is increased.

However, since a force sensor is frail, the force sensor may break down when an overload is applied to the force sensor. So, a force sensor protection mechanism intended to reduce the labor for repair or replacement has been proposed.

Japanese Patent Laid-Open No. 2004-174696 discloses a robot arm in which an arm, a force sensor, and an end effector are connected. By engaging an active engaging member fixed to the arm and a passive engaging member fixed to the end effector with each other, the arm and the end effector are fixed to each other, and by disengaging them from each other, the force sensor is made operable.

In recent years, manipulators have been required to be capable of highly accurate positioning so that they can perform more precise work, and the manipulator tip position when a force acts has been required to be highly accurate and to be small in the amount of displacement. That is, a force sensor has been required to be small in the amount of displacement, to have high rigidity, and to be capable of sensitive measurement despite its high rigidity. Therefore, a force sensor protection mechanism has been required to be highly accurate so as to prevent a member that is small in the amount of displacement from being excessively strained. Under these circumstances, a force sensor is configured to be capable of sensitive measurement despite the high rigidity of the sensitive member and the small change in physical quantity in response to acting force.

In order to manufacture an active engaging member and a passive engaging member with a high degree of accuracy, processing accuracy and assembly accuracy need to be increased. However, there is a limit, and a manufacturing error occurs. In a system in which an arm, a force sensor, and an end effector are connected, the force sensor is subject to constraint by engaging an active engaging member with a passive engaging member. If there is a manufacturing error in the active engaging member and the passive engaging member, the force sensor is constrained in a deformed state owing to the manufacturing error, and an overload continues to be applied to the force sensor. The force sensor in an overloaded state breaks down easily. If the force of engagement between the active engaging member and the passive engaging member is weakened, they do not function as a force sensor protection mechanism.

SUMMARY OF THE INVENTION

The present invention provides a force sensor protection mechanism, and an end effector and robot arm having a force sensor protection mechanism that, when protecting a force sensor, do not restrict the operation of the force sensor by mechanical constraint so that an overload is not applied to the force sensor.

In an aspect of the present invention, a force sensor protection mechanism includes a first member, a second member that is a separate member from the first member, a force sensor fixed to the second member with a space between the force sensor and the first member, and detecting relative displacement force of the second member relative to the first member when the second member is displaced relative to the first member, a supporting member supported by the first member and movable to a first position where the supporting member is separated from the second member and supports the force sensor and a second position where the supporting member is separated from the force sensor and supports the second member, and a driving unit selectively driving the supporting member to either the first position or the second position.

Further features of the present invention will become apparent from the following description of exemplary embodiments with reference to the attached drawings.

BRIEF DESCRIPTION OF THE DRAWINGS

FIGS. 5A and 5B are sectional views showing a robot apparatus according to a second embodiment.

FIGS. 6A and 6B are sectional views showing a robot apparatus according to a third embodiment.

DESCRIPTION OF THE EMBODIMENTS

Embodiments of the present invention will now be described in detail with reference to the drawings.

First Embodiment

Figure 1:
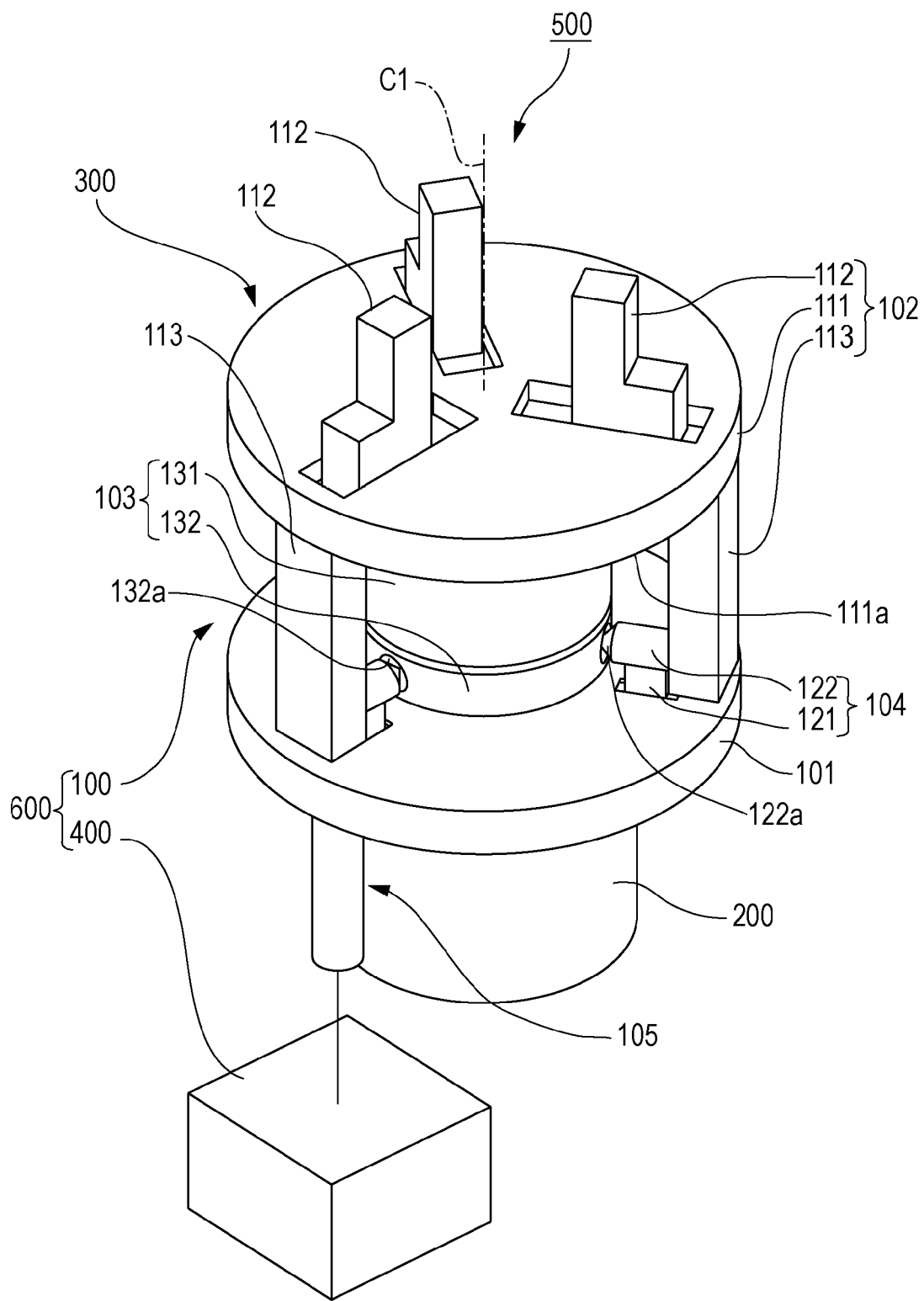
FIG. 1 is a perspective view showing the approximate configuration of a robot apparatus according to a first embodiment.
Figure 2A:
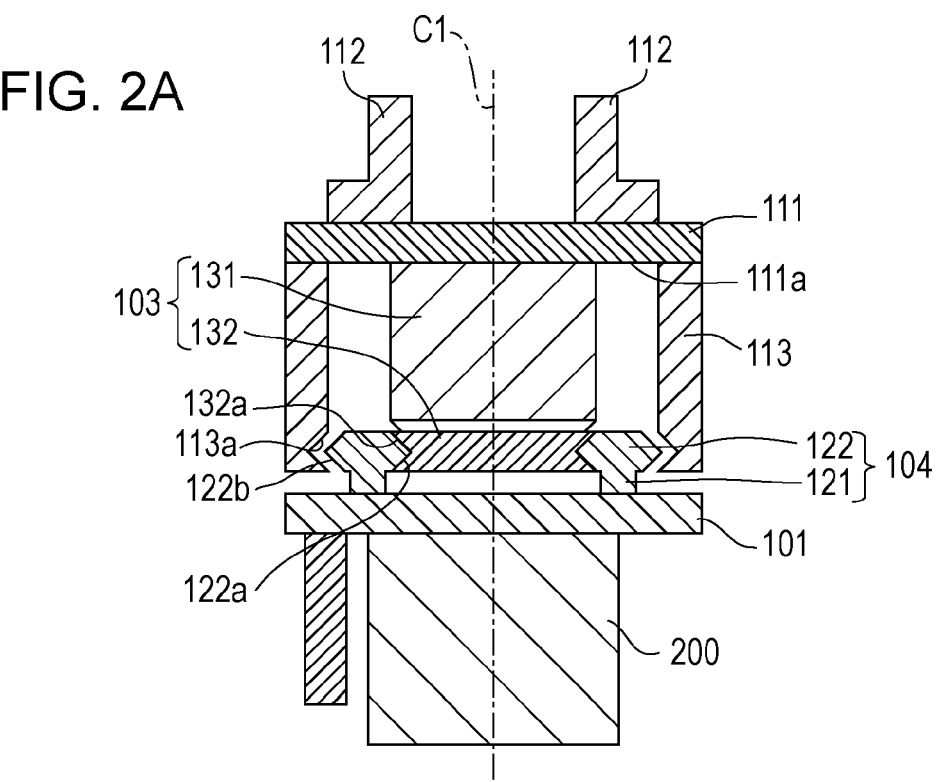
FIGS. 2A and 2B are sectional views showing the robot apparatus according to the first embodiment.
Figure 2B:
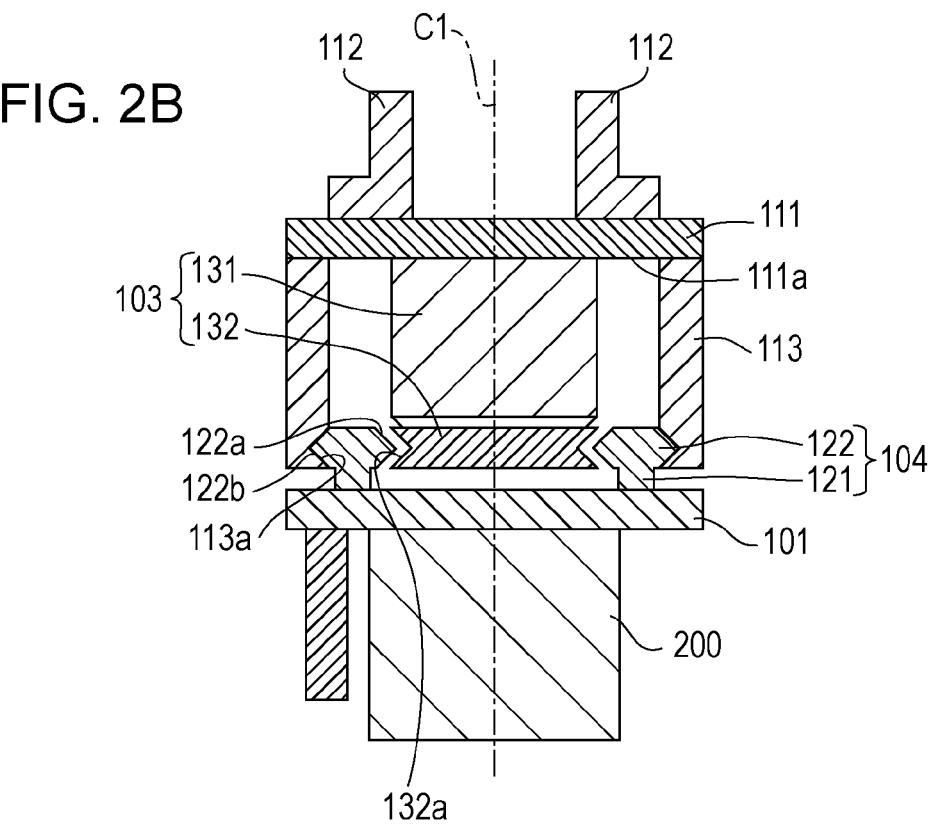
Figure 3:
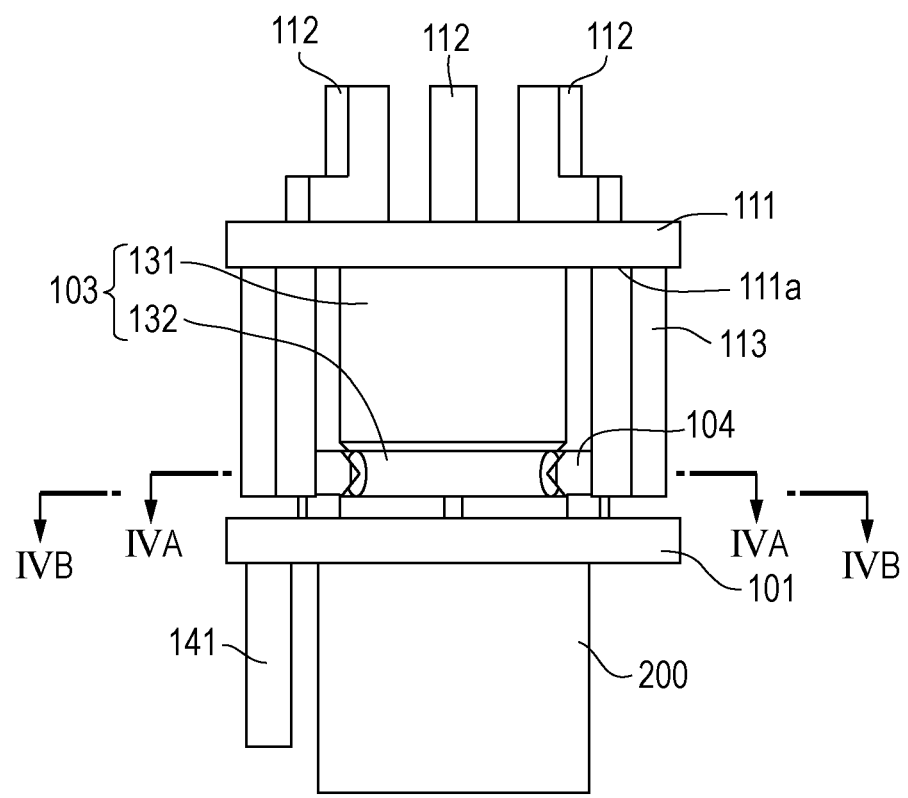
FIG. 3 is a side view showing the robot apparatus according to the first embodiment.
Figure 4A:
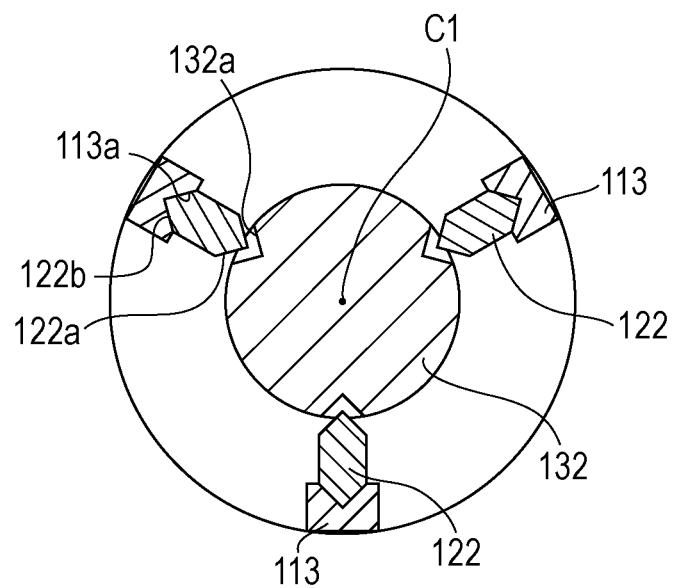
FIGS. 4A and 4B are sectional views showing a force sensor protection mechanism according to the first embodiment.
Figure 4B:
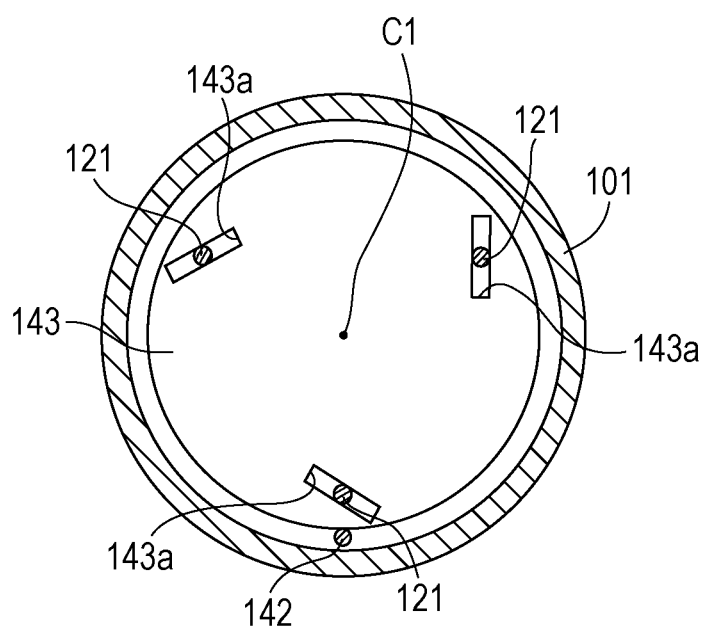

FIG. 1 is a perspective view showing the approximate configuration of a robot apparatus according to a first embodiment of the present invention. FIGS. 2A and 2B are sectional views showing the robot apparatus according to the first embodiment of the present invention. FIG. 2A shows a state where supporting members are moved to a first position. FIG. 2B shows a state where the supporting members are moved to a second position. FIG. 3 is a side view showing the robot apparatus according to the first embodiment of the present invention. FIGS. 4A and 4B are sectional views showing a force sensor protection mechanism. FIG. 4A is a sectional view taken along line IVA-IVA of FIG. 3. FIG. 4B is a sectional view taken along line IVB-IVB of FIG. 3.

As shown in FIG. 1, a robot apparatus 500 includes a multi-jointed robot arm 200, an end effector 300 having a force sensor protection mechanism 100, and a control device (control unit) 400 that controls the force sensor protection mechanism 100. The force sensor protection mechanism 100 and the control device 400 form a force sensor protection device 600.

The end effector 300 is configured to be attachable to the distal end of the robot arm 200, and is attached to the distal end of the robot arm 200 in FIGS. 1, 2A, 2B, and 3. In FIGS. 1, 2A, 2B, and 3, only the distal end of the robot arm 200 is depicted, and depiction of the other part is omitted. The distal end of the robot arm 200 is substantially cylindrical.

The force sensor protection mechanism 100 includes an end effector base 101 as a first member, a finger unit 102 as a second member, a force sensor 103, a plurality of (three) supporting members 104, and a driving unit 105. Although, in this embodiment, a case where the number of the supporting members 104 is three will be described, the number of the supporting members 104 is at least two and preferably three or more.

The end effector base 101 and the finger unit 102 are formed as separate members, and are disposed with a space therebetween. The force sensor 103 is attached and fixed to the finger unit 102, and is disposed with a space between it and the end effector base 101.

The end effector base 101 is a disk-like hollow member. The end effector base 101 is connected to the distal end of the robot arm 200 by screwing coaxially with the robot arm 200.

The finger unit 102 has a finger base 111 having a flat plate (circular plate) 111a to which the force sensor 103 is fixed. The finger unit 102 has, in the finger base 111, a plurality of (three) fingers 112 evenly disposed at regular intervals (120 degrees) about the central axis C1. The fingers 112 are supported by the finger base 111 such that they can perform linear movement in the radial direction with respect to the central axis C1.

The force sensor 103 is cylindrical, and has such a structure that it can detect force when both upper and lower ends thereof are fixed. One end thereof is connected to the flat plate 111a of the disk-shaped finger base 111 by screwing coaxially with the finger base 111. The force sensor 103 detects relative displacement force of the finger unit 102 relative to the end effector base 101 when the finger unit 102 is displaced relative to the end effector base 101. Here, the central axis C1 is the central axis of the finger base 111, is the central axis of the force sensor 103, and is the central axis of the distal end (distal end link) of the robot arm 200.

The supporting members 104 are disposed on the radially outer side of the force sensor 103, at regular intervals (120 degrees) about the central axis C1, and are supported by the end effector base 101 such that they can perform linear movement in the radial direction with respect to the central axis C1. That is, the supporting members 104 can move to a first position (FIG. 2A) where they are separated from the finger unit 102 and support the force sensor 103, and a second position (FIG. 2B) where they are separated from the force sensor 103 and support the finger unit 102.

As shown in FIG. 1, each supporting member 104 has a pin 121 and an engaging member 122 fixed to the distal end of the pin 121. The pin 121 and the engaging member 122 are connected, for example, by screwing. By operating the pin 121, the engaging member 122 can be operated. The pin 121 supports the engaging member 122 movably in the radial direction with respect to the central axis C1.

As shown in FIG. 4A, the engaging member 122 has a protruding portion 122a that is a first engaging portion, and a protruding portion 122b that is a second engaging portion formed on the side opposite to the protruding portion 122a.

As shown in FIG. 1, the force sensor 103 includes a cylindrical sensor main body 131, and a cylindrical engaged member 132 that is fixed to the sensor main body 131 with screws or the like coaxially with one end (the lower end in FIG. 1) of the sensor main body 131 and that is a first engaged member.

The other end (the upper end in FIG. 1) of the sensor main body 131 is fixed to the flat plate 111a of the finger base 111 of the finger unit 102.

As shown in FIG. 4A, a plurality of (three) recessed portions 132a that are first engaged portions are formed in the outer peripheral surface of the engaged member 132 so as to engageably face the protruding portions 122a of the engaging members 122. The three recessed portions 132a are evenly disposed at regular intervals (120 degrees) about the central axis C1.

The finger unit 102 has a plurality of (three) engaged members 113 that are second engaged members. The engaged members 113 are formed in prismatic shapes extending in the same direction as the direction in which the central axis C1 extends, to positions where they face the protruding portions 122a of the engaging members 122, and are fixed to the flat plate 111a of the finger base 111 with screws or the like. The engaged members 113 are disposed on the outer side of the supporting members 104 in the radial direction with respect to the central axis C1, and have recessed portions 113a formed therein that are second engaged portions that engageably face the protruding portions 122b of the engaging members 122.

By linearly moving the engaging members 122 toward the central axis C1, the engaging members 122 are moved to the first position shown in FIG. 2A, where the engaging members 122 are separated from the engaged members 113, and the protruding portions 122a of the engaging members 122 are engaged with the recessed portions 132a of the engaged member 132. By linearly moving the engaging members 122 away from the central axis C1, the engaging members 122 are moved to the second position shown in FIG. 2B, where the engaging members 122 are separated from the engaged member 132, and the protruding portions 122b of the engaging members 122 are engaged with the recessed portions 113a of the engaged members 113.

The protruding portions 122a and 122b of the engaging members 122, the recessed portions 132a of the engaged member 132, and the recessed portions 113a of the engaged members 113 are formed of a high friction material, so that when force acts on the finger unit 102, the recessed portions and the protruding portions are prevented from being disengaged from each other. Since the recessed portions 132a of the engaged member 132, the supporting members 104, the recessed portions 113a of the engaged members 113 are evenly disposed at regular intervals of 120 degrees, pressing forces at the time of engagement can cancel each other out.

Under the control of the control device 400, the driving unit 105 selectively drives the supporting members 104 to either the first position or the second position. The driving unit 105 has a rotary drive source 141 composed of an electromagnetic motor and a reducer as shown in FIG. 3, and a cam member 143 as shown in FIG. 4B. The cam member 143 is disposed inside the end effector base 101, and is supported rotatably about the central axis C1 relative to the end effector base 101.

The rotary drive source 141 is attached to the end effector base 101 eccentrically from the central axis C1. A drive shaft 142 (FIG. 4B) connected to the rotary drive source 141 is in contact with the outer peripheral surface of the disk-shaped cam member 143. For example, a gear (not shown) is fixed to the drive shaft 142, and teeth with which the gear meshes are formed on the outer peripheral surface of the cam member 143. The rotational force of the drive shaft 142 is thereby transmitted to the cam member 143, and the cam member 143 is rotationally driven about the central axis C1. That is, the rotary drive source 141 rotationally drives the cam member 143 through the drive shaft 142.

The pins 121 serve as cam followers for the cam member 143. The same number of cam grooves 143a as the number of the supporting members 104 are formed in the cam member 143. The radial distance of the cam grooves 143a from the cam center (central axis C1) varies with angle of rotation. The pins 121 of the supporting members 104 are passed through the cam grooves 143a. By rotating the cam member 143 about the central axis C1, the pins 121 are guided by the cam grooves 143a, and are moved in the radial direction with respect to the central axis C1. The cam member 143 is installed inside the end effector base 101. Since the rotational movement of the cam member 143 is converted into the linear movement of the pins 121, the engaging member 122 supported by the pins 121 linearly move in a direction perpendicular to the longitudinal direction of the robot arm 200 (that is, the radial direction).

The control device 400 controls the rotary drive source 141 to rotate the cam member 143, and the engaging members 122 of the supporting members 104 are thereby moved radially inward. Thereby, the protruding portions 122a of the engaging members 122 are brought into an engaged state where they are engaged with the recessed portions 132a of the engaged member 132, and the protruding portions 122b of the engaging members 122 are brought into a disengaged state where they are separated from the recessed portions 113a of the engaged members 113. Thus, both ends of the force sensor 103 are connected to the finger unit 102 and the robot arm 200.

The supporting members 104 are moved to the first position shown in FIG. 2A and undisplaceably support the engaged member 132 of the force sensor 103, but the sensor main body 131 is displaced with the displacement of the displaceable finger unit 102.

The load on the finger unit 102 (that is, the displacement of the finger unit 102) is transmitted to the sensor main body 131 of the force sensor 103, and the load (force) is detected by the sensor main body 131 of the force sensor 103.

That is, the load on the finger unit 102 is transmitted through the sensor main body 131, the engaged member 132, the engaging members 122, and the end effector base 101 to the robot arm 200, and the robot arm 200 supports the load. Since the load is transmitted through the force sensor 103, the load can be measured.

The control device 400 controls the rotary drive source 141 to reversely rotate the cam member 143, and the engaging members 122 of the supporting members 104 are thereby moved radially outward. Thereby, the protruding portions 122b of the engaging members 122 are brought into an engaged state where they are engaged with the recessed portions 113a of the engaged members 113, and the protruding portions 122a of the engaging members 122 are brought into a disengaged state where they are separated from the recessed portions 132a of the engaged member 132.

The supporting members 104 are moved to the second position shown in FIG. 2B, support the engaged members 113 of the finger unit 102, and make the finger unit 102 undisplaceable relative to the end effector base 101. Since the engaging members 122 of the supporting members 104 are separated from the force sensor 103, constraint force of the supporting members 104 does not act on the force sensor 103. That is, in a state where the supporting members 104 are moved to the second position, an overload due to structural excessive constraint is not applied to the force sensor 103.

The load on the finger unit 102 is transmitted through the engaged members 113, the engaging members 122, and the end effector base 101 to the robot arm 200, and the robot arm 200 supports the load. Since the load on the finger unit 102 is transmitted not through the force sensor 103, an overload is not applied to the force sensor 103.

If the rotary drive source 141 is a USM (ultrasonic motor), each engaged state can be held without energization by utilizing large holding force at rest, which is a characteristic of a USM.

When the output value of the force sensor 103 is used, the control device 400 controls the rotary drive source 141 of the driving unit 105 such that the supporting members 104 are moved to the first position shown in FIG. 2A. Thus, a displacement force (load) acting on the finger unit 102 can be detected by the force sensor 103.

When the output value of the force sensor 103 is not used, the control device 400 controls the rotary drive source 141 of the driving unit 105 such that the supporting members 104 are moved to the second position shown in FIG. 2B. Thus, structurally, no load is applied to the force sensor 103, and therefore a protection function for the force sensor 103 is fulfilled.

By maintaining the same state in a non-energized state such as during transportation, the force sensor 103 can be protected from a human error such as a collision of the end effector 300 with something or dropping the end effector 300.

Next, in the case of an operation using the output of the force sensor 103, the control device 400 controls the rotary drive source 141 of the driving unit 105 such that the supporting members 104 are moved to the first position show in FIG. 2A.

When the detection value (displacement force) detected by the force sensor 103 is greater than or equal to a preset threshold value, the control device 400 controls the rotary drive source 141 of the driving unit 105 such that the supporting members 104 are moved to the second position show in FIG. 2B. Here, the threshold value is set to a value that is not an overload. Thereby, the protruding portions 122a of the engaging members 122 are disengaged from the recessed portions 132a of the engaged member 132, and the protruding portions 122b of the engaging members 122 are engaged with the recessed portions 113a of the engaged members 113. Therefore, a protection function against an excessive load on the force sensor 103 is fulfilled.

When using the output value of the force sensor 103 after an overload is detected in advance, first, the cause of the overload is removed, for example, by moving the robot arm 200 or removing an obstacle. After that, when the operation using the output of the force sensor 103 is continued, the control device 400 controls the rotary drive source 141 of the driving unit 105 such that the supporting members 104 are moved to the first position shown FIG. 2A. When the detection value (displacement force) detected by the force sensor 103 is greater than or equal to a preset threshold value, the control device 400 controls the rotary drive source 141 of the driving unit 105 such that the supporting members 104 are moved to the second position shown in FIG. 2B. Thereby, the protruding portions 122a of the engaging members 122 are disengaged from the recessed portions 132a of the engaged member 132, and the protruding portions 122b of the engaging members 122 are engaged with the recessed portions 113a of the engaged members 113. Therefore, a protection function against an excessive load on the force sensor 103 is fulfilled.

According to the first embodiment, by the driving of the driving unit 105, the supporting members 104 are moved to the first position (FIG. 2A) where they are separated from the engaged members 113 of the finger unit 102 and support the force sensor 103. By moving the supporting members 104 to the first position, force acting between the end effector base 101 and the finger unit 102 can be made to act on the force sensor 103, and the force sensor 103 can be made to detect the force.

By the driving of the driving unit 105, the supporting members 104 are moved to the second position (FIG. 2B) where they are separated from the force sensor 103 and support the finger unit 102. Thereby, force can be made not to act on the force sensor 103, and the force sensor 103 can be protected. In this state, the force sensor 103 is fixed only at one end. Therefore, unlike the conventional robot apparatus, constraint force does not act on the force sensor 103. Therefore, the force sensor 103 can also be protected from an overload due to constraint force.

Second Embodiment

Next, a robot apparatus to which a force sensor protection mechanism according to a second embodiment of the present invention is applied will be described. FIGS. 5A and 5B are sectional views showing the robot apparatus according to the second embodiment of the present invention. FIG. 5A shows a state where supporting members are moved to a first position. FIG. 5B shows a state where the supporting members are moved to a second position. In the second embodiment, the same reference numerals will be used to designate the same components as those in the first embodiment, and the description thereof will be omitted.

In the first embodiment, a description has been given of a case where a driving unit has a rotary drive source, and rotational movement is converted into linear movement to move supporting members. In the second embodiment, a description will be given of a case where a driving unit has a linear drive source, and linear movement is converted into rotational movement to move supporting members.

The robot apparatus 500A of the second embodiment includes a robot arm 200, an end effector 300A having a force sensor protection mechanism 100A, and a control device (not shown) that is substantially the same as the control device 400 of the first embodiment.

The end effector 300A is configured to be attachable to the distal end of the robot arm 200, and is attached to the distal end of the robot arm 200 in FIGS. 5A and 5B. In FIGS. 5A and 5B, only the distal end of the robot arm 200 is depicted, and depiction of the other part is omitted.

The force sensor protection mechanism 100A includes an end effector base 101 as a first member, a finger unit 102 as a second member, a force sensor 103, a plurality of (three) supporting members 104, and a driving unit 105A.

The proximal ends of the pins 121 of the supporting members 104 are rockably supported relative to the end effector base 101.

The driving unit 105A has connecting members 144 first ends of which are connected to the proximal ends of the pins 121, and a linear drive source 141A that linearly drives second ends of the connecting members 144 in a direction parallel to the direction in which the central axis C1 extends and that rocks the pins 121 through the connecting members 144.

The linear drive source 141A is, for example, a solenoid. Linear movement of the linear drive source 141A is converted by a link structure into rocking movement in a direction toward or away from the central axis C1, and force pressing the engaging members 122 against the engaged member 132 or the engaged members 113 is generated.

Specifically, the control device (not shown) controls the linear drive source 141A to rock the connecting members 144, and the engaging members 122 of the supporting members 104 are thereby moved radially inward. Thereby, the protruding portions 122a of the engaging members 122 are brought into an engaged state where they are engaged with the recessed portions 132a of the engaged member 132, and the protruding portions 122b of the engaging members 122 are brought into a disengaged state where they are separated from the recessed portions 113a of the engaged members 113. Thus, both ends of the force sensor 103 are connected to the finger unit 102 and the robot arm 200.

The supporting members 104 are moved to the first position shown in FIG. 5A and undisplaceably support the engaged member 132 of the force sensor 103, but the sensor main body 131 is displaced with the displacement of the displaceable movable finger unit 102.

The load on the finger unit 102 (that is, the displacement of the finger unit 102) is transmitted to the sensor main body 131 of the force sensor 103, and the load (force) is detected by the sensor main body 131 of the force sensor 103.

That is, the load on the finger unit 102 is transmitted through the sensor main body 131, the engaged member 132, the engaging members 122, and the end effector base 101 to the robot arm 200, and the robot arm 200 supports the load. Since the load is transmitted through the force sensor 103, the load can be measured.

The control device (not shown) controls the linear drive source 141A to reversely rock the connecting members 144, and the engaging members 122 of the supporting members 104 are thereby moved radially outward. Thereby, the protruding portions 122b of the engaging members 122 are brought into an engaged state where they are engaged with the recessed portions 113a of the engaged members 113, and the protruding portions 122a of the engaging members 122 are brought into a disengaged state where they are separated from the recessed portions 132a of the engaged member 132.

The supporting members 104 are moved to the second position shown in FIG. 5B, support the engaged members 113 of the finger unit 102, and make the finger unit 102 undisplaceable relative to the end effector base 101. Since the engaging members 122 of the supporting members 104 are separated from the force sensor 103, constraint force of the supporting members 104 does not act on the force sensor 103. That is, in a state where the supporting members 104 are moved to the second position, an overload due to structural excessive constraint is not applied to the force sensor 103.

The load on the finger unit 102 is transmitted through the engaged members 113, the engaging members 122, and the end effector base 101 to the robot arm 200, and the robot arm 200 supports the load. Since the load on the finger unit 102 is transmitted not through the force sensor 103, an overload is not applied to the force sensor 103.

By utilizing the linear drive source 141A, an extremely short operation time can be achieved because the operation distance necessary to drive the supporting members 104 is small.

Third Embodiment

Next, a robot apparatus to which a force sensor protection mechanism according to a third embodiment of the present invention is applied will be described. FIGS. 6A and 6B are sectional views showing the robot apparatus according to the third embodiment of the present invention. FIG. 6A shows a state where supporting members are moved to a first position. FIG. 6B shows a state where the supporting members are moved to a second position. In the third embodiment, the same reference numerals will be used to designate the same components as those in the first and second embodiments, and the description thereof will be omitted.

The robot apparatus 500B of the third embodiment includes a robot arm 200, an end effector 300B having a force sensor protection mechanism 100B, and a control device (not shown) that is substantially the same as the control device 400 of the first embodiment.

The end effector 300B is configured to be attachable to the distal end of the robot arm 200, and is attached to the distal end of the robot arm 200 in FIGS. 6A and 6B. In FIGS. 6A and 6B, only the distal end of the robot arm 200 is depicted, and depiction of the other part is omitted.

The force sensor protection mechanism 100B includes an end effector base 101B as a first member, a finger unit 102B as a second member, a force sensor 103B, a plurality of (three) supporting members 104B, and a plurality of (three) driving units 105B. Although, in this embodiment, a case where the number of the supporting members 104B is three will be described, the number of the supporting members 104 is at least two and preferably three or more.

The end effector base 101B and the finger unit 102B are formed as separate members, and are disposed with a space therebetween. The force sensor 103B is attached and fixed to the finger unit 102B, and is disposed with a space between it and the end effector base 101B.

The end effector base 101B is a first flat plate formed in a disk shape. The end effector base 101B is connected to the distal end of the robot arm 200 by screwing coaxially with the robot arm 200.

The finger unit 102B has a finger base 111 having a flat plate (circular plate) 111a that is a second flat plate to which the force sensor 103B is fixed. The finger unit 102B has, in the finger base 111, a plurality of (three) fingers evenly disposed at regular intervals (120 degrees) about the central axis C1.

The finger unit 102B further has rod members 114 the proximal ends of which are fixed to the flat plate 111a and that extend from the flat plate 111a toward the end effector base 101B, and stopper members 115 provided at the distal ends of the rod members 114.

Through-holes 101a through which the rod members 114 are passed are formed in the end effector base 101B. The stopper members 115 are disposed on the side of the end effector base 101B opposite to the side on which the force sensor 103B is disposed. The end effector base 101B is a flange member that has a sectional area larger than the sectional area of the robot arm 200 and that protrudes from the robot arm 200 in the radial direction with respect to the central axis C1.

Each supporting member 104B has a shaft portion 123 extending in a direction parallel to the direction in which the central axis C1 extends, and a claw portion 124 supported (fixed) at the distal end of the shaft portion 123 and extending inward in the radial direction with respect to the central axis C1. The driving units 105B are linear drive sources that linearly drive the supporting members 104B in a direction parallel to the direction in which the central axis C1 extends, and are, for example, solenoids. Thus, the supporting members 104B (the claw portions 124) can move in a direction parallel to the direction in which the central axis C1 extends.

The force sensor 103B includes a cylindrical sensor main body 131, and a flange member (first engaged member) 132B that is fixed to the sensor main body 131 with screws or the like coaxially with one end (the lower end in FIGS. 6A and 6B) of the sensor main body 131. The flange member 132B is formed in a flat plate shape protruding from the sensor main body 131 in the radial direction with respect to the central axis C1.

By being moved to the first position shown in FIG. 6A by the driving of the driving units 105B, the supporting members 104B hook the claw portions 124 on the flange member 132B of the force sensor 103B, press the force sensor 103B against a first surface of the end effector base 101B, and support the force sensor 103B. That is, the first surface of the end effector base 101B is a pressed surface against which the force sensor 103B (the flange member 132B) is pressed.

By being moved to the second position shown in FIG. 6B by the driving of the driving units 105B, the supporting members 104B press the flat plate 111a with the outer sides of the claw portions 124 in the direction in which the central axis C1 extends, and move the finger unit 102B in the direction in which the central axis C1 extends. Thereby, the supporting members 104B press the stopper members 115 against a second surface of the end effector base 101B, and undisplaceably support the finger unit 102B relative to the end effector base 101B.

According to the third embodiment, by the driving of the driving unit 105B, the supporting members 104B are moved to the first position (FIG. 6A) where they are separated from the flat plate 111a of the finger unit 102B and support the force sensor 103B. By moving the supporting members 104B to the first position, force acting between the end effector base 101B and the finger unit 102B can be made to act on the force sensor 103B, and the force sensor 103B can be made to detect the force.

By the driving of the driving unit 105B, the supporting members 104B are moved to the second position (FIG. 6B) where they are separated from the force sensor 103B and support the finger unit 102B. Thereby, force can be made not to act on the force sensor 103B, and the force sensor 103B can be protected. In this state, the force sensor 103B is fixed only at one end. Therefore, unlike the conventional robot apparatus, constraint force does not act on the force sensor 103B. Therefore, the force sensor 103B can also be protected from an overload due to constraint force.

The present invention is not limited to the adhesive embodiments, and various changes may be made by a person skilled in the art without departing from the technical idea of the present invention.

In the first and second embodiments, a description has been given of a case where the first engaging portions of the engaging members 122 are protruding portions 122a, and the first engaged portions of the engaged member 132 are recessed portions 132a. However, the present invention is not limited to this. The first engaging portions of the engaging members 122 may be recessed portions, and the first engaged portions of the engaged member 132 may be protruding portions.

In the first and second embodiments, a description has been given of a case where the second engaging portions of the engaging members 122 are protruding portions 122b, and the second engaged portions of the engaged members 113 are recessed portions 113a. However, the present invention is not limited to this. The second engaging portions of the engaging members 122 may be recessed portions, and the second engaged portions of the engaged members 113 may be protruding portions.

In the first to third embodiments, a description has been given of a case where an end effector has a force sensor protection mechanism. However, the present invention is not limited to this. A robot arm to which an end effector can be attached may have a force sensor protection mechanism having substantially the same configuration as any one of the force sensor protection mechanisms described in the first to third embodiments.

According to the present invention, by moving the supporting members, by driving the driving unit, to the first position where they are separated from the second member and support the force sensor, force acting between the first member and the second member can be made to act on the force sensor, and the force sensor can be made to detect the force.

By moving the supporting members, by driving the driving unit, to the second position where they are separated from the force sensor and support the second member, force can be made not to act on the force sensor, and the force sensor can be protected. In this state, the force sensor is fixed only at one end. Therefore, unlike the conventional robot apparatus, constraint force does not act on the force sensor. Therefore, the force sensor can also be protected from an overload due to constraint force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-209069 filed Oct. 4, 2013, which is hereby incorporated by reference herein in its entirety.

What is claimed is:

1. A force sensor protection mechanism comprising:
   a first member;
   a second member that is a separate member from the first member;
   a force sensor fixed to the second member with a space between the force sensor and the first member, and detecting relative displacement force of the second member relative to the first member when the second member is displaced relative to the first member;
   a supporting member supported by the first member and movable to a first position where the supporting member is separated from the second member and supports the force sensor and a second position where the supporting member is separated from the force sensor and supports the second member; and
   a driving unit selectively driving the supporting member to either the first position or the second position.

2. The force sensor protection mechanism according to claim 1,
   wherein the supporting member includes an engaging member having a first engaging portion and a second engaging portion formed on the side opposite to the first engaging portion, and a pin supporting the engaging member movably in a radial direction with respect to a central axis of the force sensor,
   wherein the force sensor includes a sensor main body, and a first engaged member fixed to one end of the sensor main body and having a first engaged portion with which the first engaging portion can be engaged, and
   wherein the second member includes a flat plate to which the other end of the sensor main body is fixed, and a second engaged member extending from the flat plate to a position where the second engaged member faces the second engaging member and having a second engaged portion with which the second engaging portion can be engaged.

3. The force sensor protection mechanism according to claim 2,
   wherein the driving unit includes a cam member in which a cam groove is formed through which the pin is passed, and that is rotatable about the central axis, and a rotary drive source that rotationally drives the cam member to move the pin along the cam groove in the radial direction.

4. The force sensor protection mechanism according to claim 3,
   wherein the rotary drive source is an ultrasonic motor.

5. The force sensor protection mechanism according to claim 2,
   wherein, of the first engaging portion and the first engaged portion, one is a recessed portion formed in a recessed shape, and the other is a protruding portion formed in a protruding shape, and
   wherein, of the second engaging portion and the second engaged portion, one is a recessed portion formed in a recessed shape, and the other is a protruding portion formed in a protruding shape.

6. An end effector attachable to a robot arm, comprising a force sensor protection mechanism,
   the force sensor protection mechanism including a first member,
   a second member that is a separate member from the first member,
   a force sensor fixed to the second member with a space between the force sensor and the first member, and detecting relative displacement force of the second member relative to the first member when the second member is displaced relative to the first member,
   a supporting member supported by the first member and movable to a first position where the supporting member is separated from the second member and supports the force sensor and a second position where the supporting member is separated from the force sensor and supports the second member, and
   a driving unit selectively driving the supporting member to either the first position or the second position.

7. A robot arm to which an end effector is attachable, comprising a force sensor protection mechanism,
   the force sensor protection mechanism including a first member,
   a second member that is a separate member from the first member,
   a force sensor fixed to the second member with a space between the force sensor and the first member, and detecting relative displacement force of the second member relative to the first member when the second member is displaced relative to the first member,
   a supporting member supported by the first member and movable to a first position where the supporting member is separated from the second member and supports the force sensor and a second position where the supporting member is separated from the force sensor and supports the second member, and
   a driving unit selectively driving the supporting member to either the first position or the second position.

* * * * *